Nov. 17, 1936. E. J. ROMANO 2,061,256
SUBMARINE SALVAGE APPARATUS
Filed Jan. 16, 1935 5 Sheets-Sheet 1

INVENTOR
EUGENE J. ROMANO
BY
Smith & Tuck
ATTORNEYS

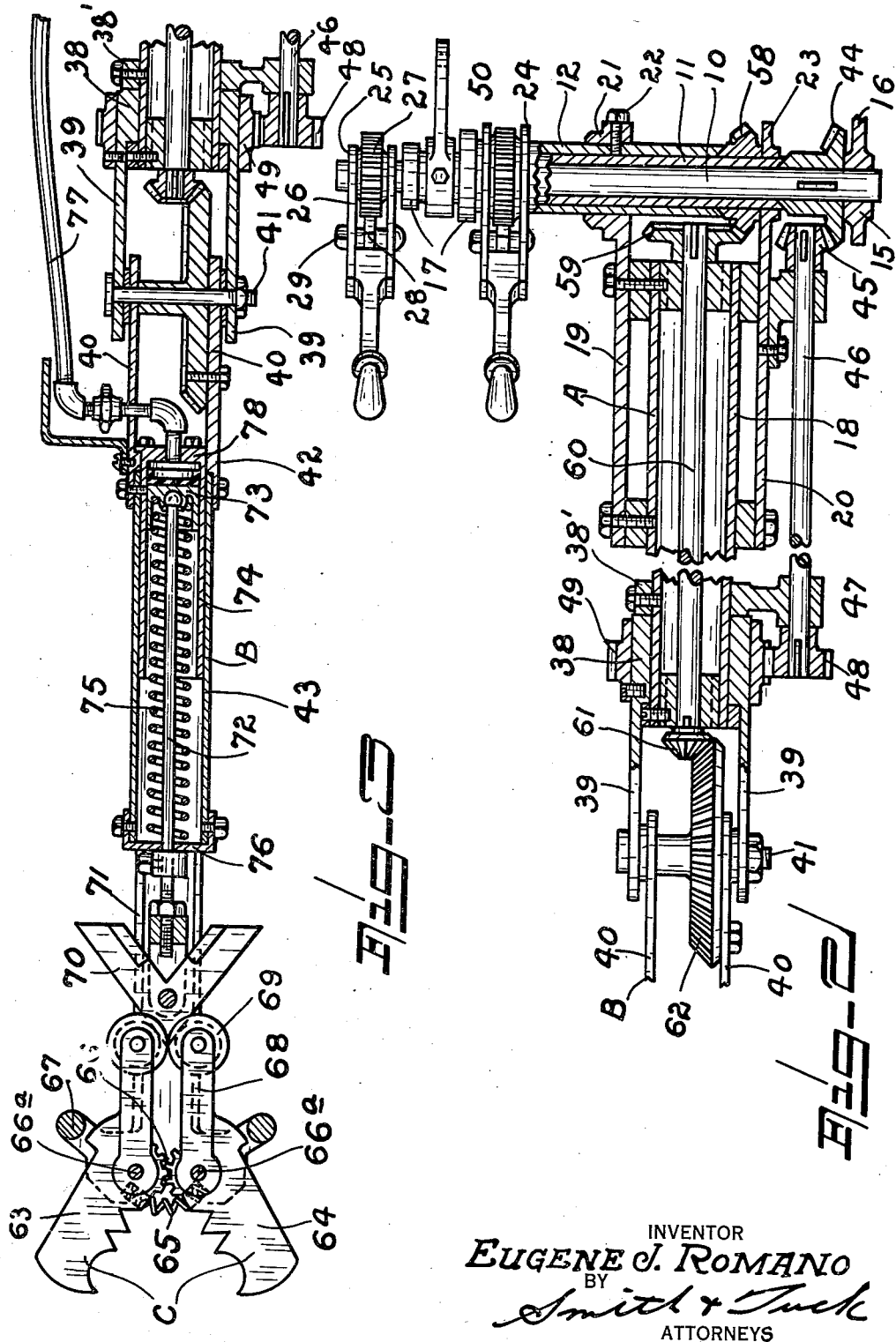

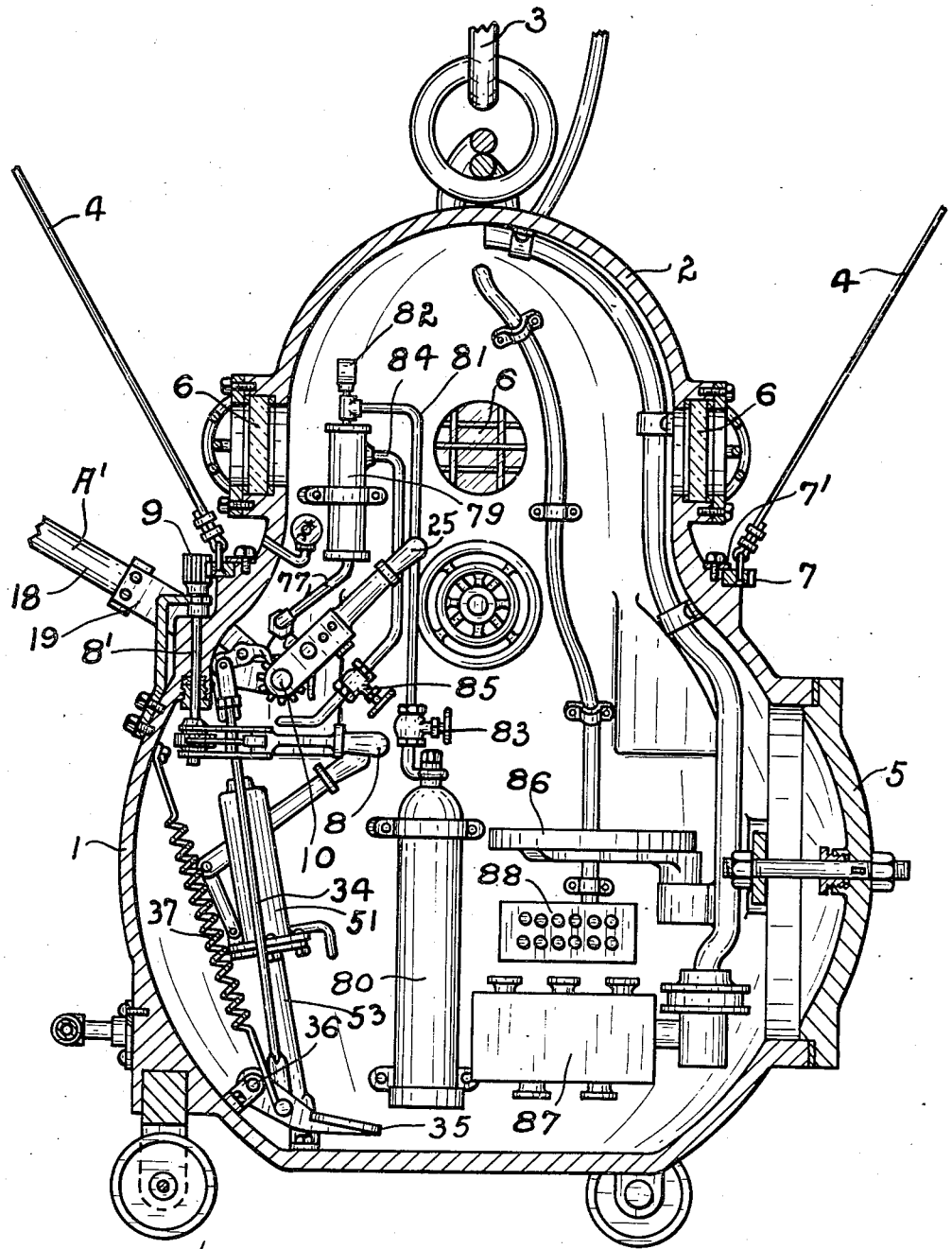

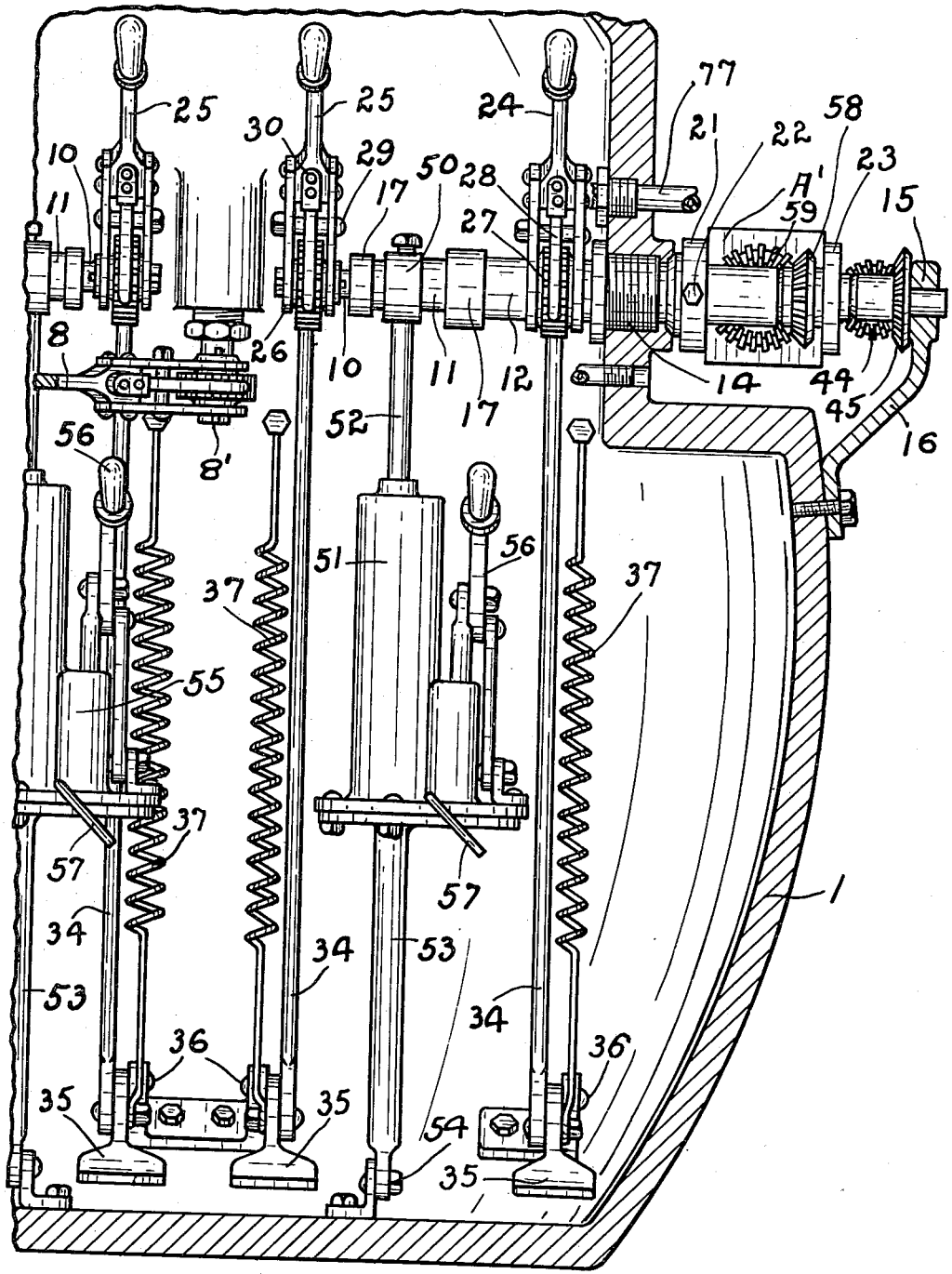

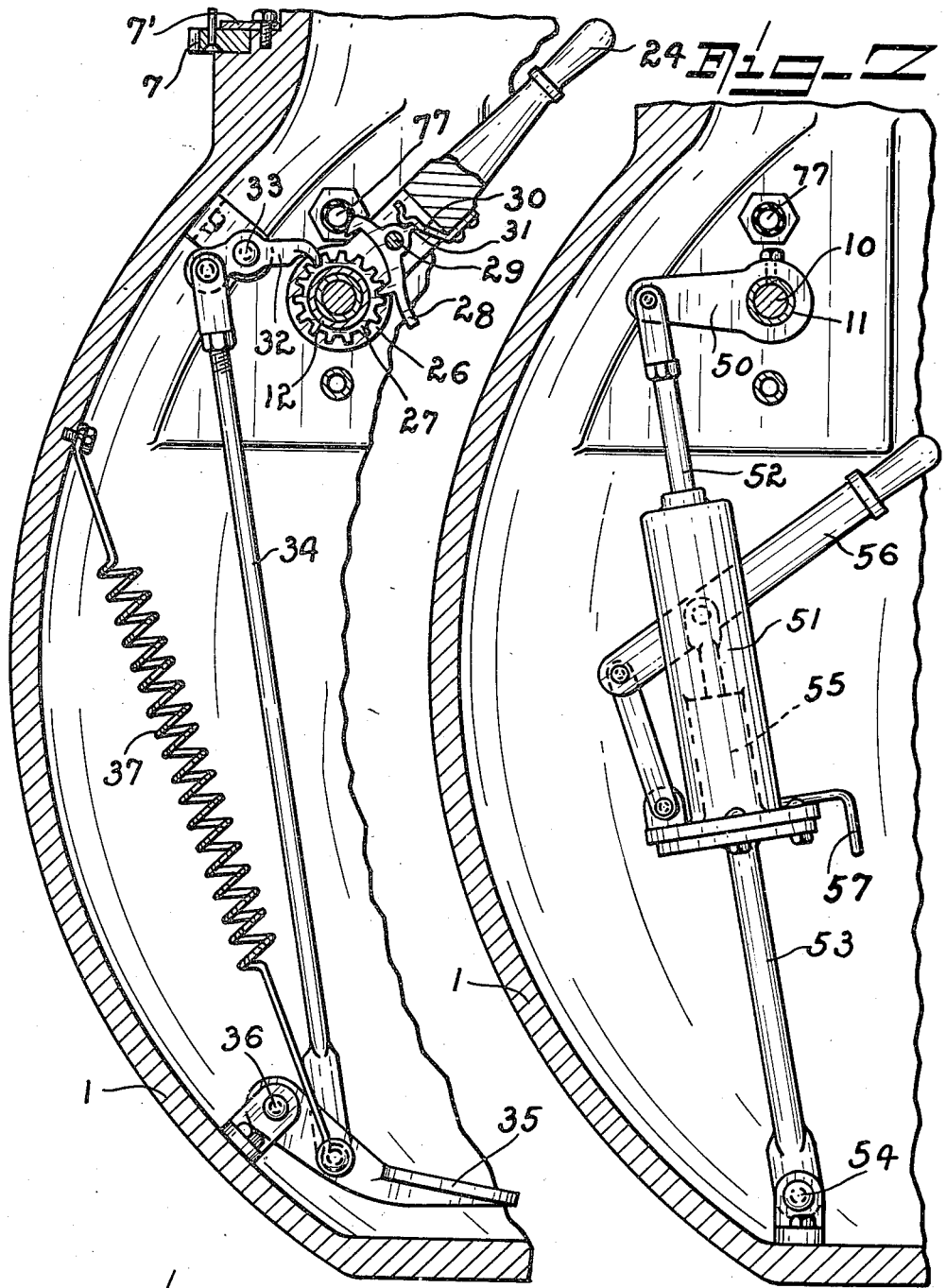

Patented Nov. 17, 1936

2,061,256

UNITED STATES PATENT OFFICE 2,061,256

SUBMARINE SALVAGE APPARATUS

Eugene J. Romano, Seattle, Wash.

Application January 16, 1935, Serial No. 2,072

5 Claims. (Cl. 61—69)

My present invention relates to improvements in submarine salvaging apparatus and particularly to the operating mechanism and control means of the duplex grappling arms forming part of the apparatus or equipment. The submarine equipment includes a diving bell in which the operator is stationed, and by the utilization of the operating mechanism and control devices of my invention the exterior, flexible, grappling arms are manipulated from the interior of the shell or diving bell, in order to swing the two arms in parallel planes with relation to the bell; to flex the arms; and to revolve one section of each of the flexible arms on its longitudinal axis. A pair of grappling jaws are mounted at the free ends of each of the grappling arms, and operating means for these jaws are also controlled from the interior of the diving bell by the operator.

By the employment of both his hands and feet, the operator is enabled to manipulate the two grappling devices and co-ordinate their functions in such facile manner as to assure efficient and rapid movements in salvaging operations while under water. The invention consists in certain novel combinations and arrangements of parts as will hereinafter be more fully set forth and claimed. In the accompanying drawings I have illustrated one complete example of the physical embodiment of my invention wherein the parts are combined and arranged according to one mode I have thus far devised for the practical application of the principles of my invention.

Figure 3 is an enlarged longitudinal sectional view of the forearm section of one of the flexible arms, together with a portion of the main section of the arm, and showing a pair of grappling jaws and operating means therefor.

Figure 4 is a vertical sectional view of the diving bell illustrating the interior equipment.

Figure 5 is an enlarged sectional view as seen from the right in Figure 4.

Figure 6 is a detail view partly in section showing one of the ratchet-lever control devices together with a pedal control, for the operating means of the flexible arms.

Figure 7 is a detail view of one of the hydro-pneumatic control devices by means of which a flexible arm is swung with relation to the diving bell.

Figure 8 is a plan view of one of the flexible arms.

Figure 1:
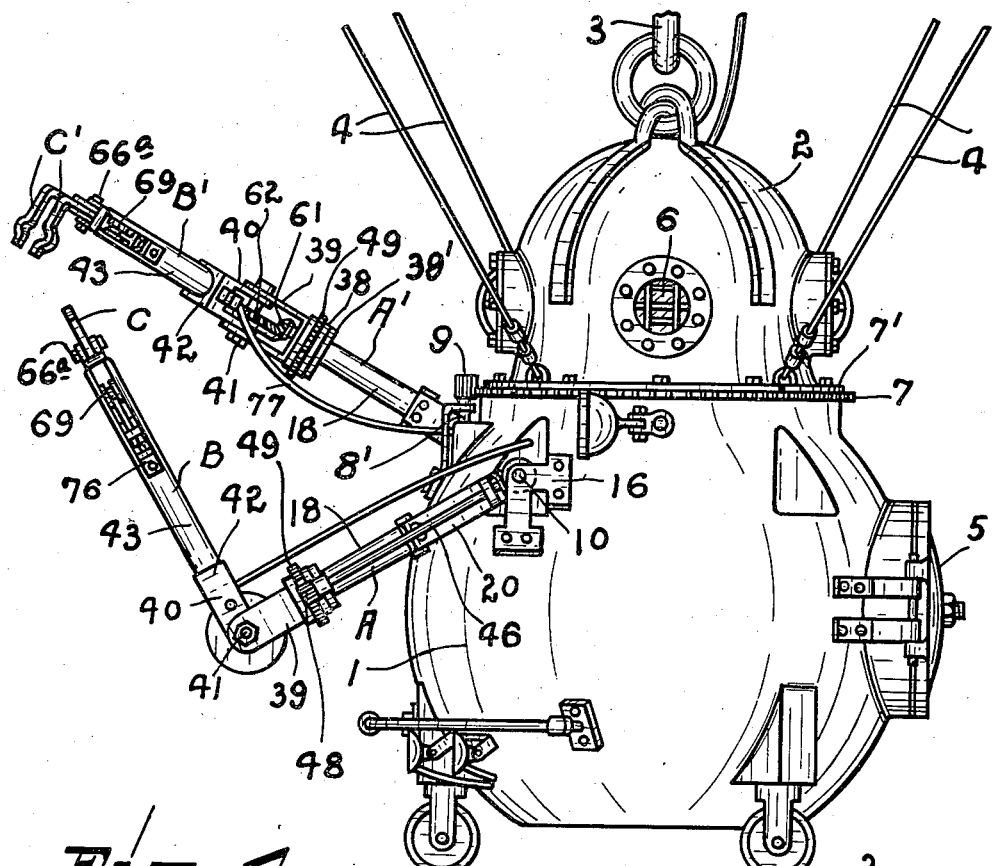
Figure 1 is a view in elevation of the salvaging apparatus, showing one of the grappling arms flexed in a vertical plane, and the other arm flexed in a horizontal plane, to illustrate the versatility of the flexible arms.

In the preferred form of my invention as illustrated in the drawings I employ a submersible bell 1 of substantially spherical shape and provided with a dome 2, which bell, when submerged, is suspended at the end of a supporting cable 3, and the bell is adapted to be maneuvered in horizontal planes by means of the lines 4, 4, in Figure 1, and Figure 4.

Entrance to the interior of the bell is through the manhole 5, and the interior of the bell is of sufficient size to accommodate one or two men, comfortable, for operation of the duplex, flexible, grappling arms, each of which comprises a main section as A and A' and a fore-arm as B and B', and at the free ends of these flexible arms are mounted the pairs of grappling jaws C and C'.

Glazed portholes 6, 6 are provided in the dome 2, and it will be understood that the bell and the dome, as a whole, or integral part is adapted to be revolved on the vertical axis of the bell. Thus I employ a supporting rack-ring 7 to which the maneuvering lines or cables 4 are attached, and this ring encompasses the bell beneath a retaining ring 7' fixed to the bell. By means of the ratchet mechanism 8 (Figures 4 and 5) swinging in a horizontal plane within the bell, the shaft 8' that extends upwardly through the wall of the bell, and the pinion 9 in engagement with the rack ring, the suspended bell may be turned on its vertical axis, within the rack-ring, to bring the flexible arms into various positions for use. The ratchet lever 8 is readily accessible, for use by the operator within bell, and means are also readily accessible to the operator for swinging the flexible arms in either clock-wise direction or anti-clockwise direction.

Each of the flexible arms is pivotally supported, exterior of the bell, by three concentric-trunnion-members, as the solid inner shaft 10, the inner tubular shaft 11, and the outer tubular shaft 12, which three members are relatively rotatable on their common longitudinal axis, and the composite trunnion thus formed is supported in bearing 14 on the wall of the bell, and bearing 15 mounted on the bracket 16 affixed at the exterior of the bell. The outer tubular shaft 12 is rotatable in the bearing 14 and the solid inner shaft 10 is journaled in the bearing 15, and the three trunnion members are fitted together with a close fit, but free for relative rotation. Suitable packing glands or boxes as 17 are provided to prevent ingress of water through these connections to the interior of the bell.

Each of the duplex grappling arms is made up of a tubular main section 18, to the inner end of which section a pair of bracket arms 19 and 20 are attached, one of these arms as 19 having an annular head 21 that encircles the outer tubular shaft 12 of the trunnion, and this annular head is fixed to the tubular shaft as by set screw 22, or in other suitable manner. The other bracket arm 20 has a complementary annular head 23 that is loosely supported on and encircles the inner tubular shaft 11 of the composite trunnion. By this arrangement the main section of the flexible arm is provided with a wide bearing or support for its pivotal movement, and the pivotal movement of the arm is imparted thereto through the instrumentality of the outer tubular shaft 12 that is rigid with the bracket arm 19.

The two control devices for swinging the flexible arms on their composite trunnions and for revolving the respective forearms of the flexible arms are of similar construction and operation, and there are four of these ratchet lever mechanisms, two of them being indicated by the levers 24 and 25, the former to control the swing of the flexible arm and the latter to revolve the forearm on its longitudinal axis.

As best seen in Figure 6, which illustrates one of the levers 24, the lever has a forked, circular head 26 loose on its axial support, which in this case is the outer tubular shaft 12, and the tubular shaft has a rack ring 27 fixed thereon between the forks of the circular head. A double escapement pawl 27 is pivoted at 29 on the lever with its ends adapted for alternate engagement with the rack ring, and a spring 30 mounted on the lever co-acts with a lug 31 of the pawl for holding the pawl off center. The pawl may be shifted so that either of its ends will engage the rackring and the flexible arm may be swung clockwise or anti-clockwise, depending on the position of the pawl with relation to the rackring.

For retaining the flexible arm against swinging, I employ a retaining latch 32 that engages the teeth of the rack-ring, and the latch is pivoted at 33 on a suitable support. The latch has a pivoted link 34 connected to a foot-lever or pedal 35 in position for ready access of the foot of the operator, and the pedal is pivoted at 36 on a bracket near the floor of the bell. A spring 37 tends to pull the pedal and its link upwardly in order that the retaining latch will engage the rack ring, and the latch is disengaged from the rack ring by depressing the pedal, so that the lever 24 may be manipulated.

The pivoted forearms B and B' each has two movements with relation to the main-section of its flexible arm, a rotary movement on its longitudinal axis attained by use of lever 25 on the solid main shaft 10, and a bending or flexible movement as will be described. The ratchet device of which the lever 25 forms a part is mounted on the shaft 10 and is similar in construction and operation to the ratchet device 24 just described, and a retaining latch-device as 32 is also employed for this ratchet device 25.

Each of the forearms B and B' has a head 38 on its tubular main-section 18, and the head is formed with a pair of bearing arms 39 that project outwardly from the main-section of the flexible arm. Two complementary plates 40, 40 are located between the two arms, and a pivot bolt 41 is passed through holes in these four members and secured against displacement. The two plates are fashioned with an integral ring 42 which surrounds and is fixed to the tubular housing 43 of the forearm.

Figure 2:
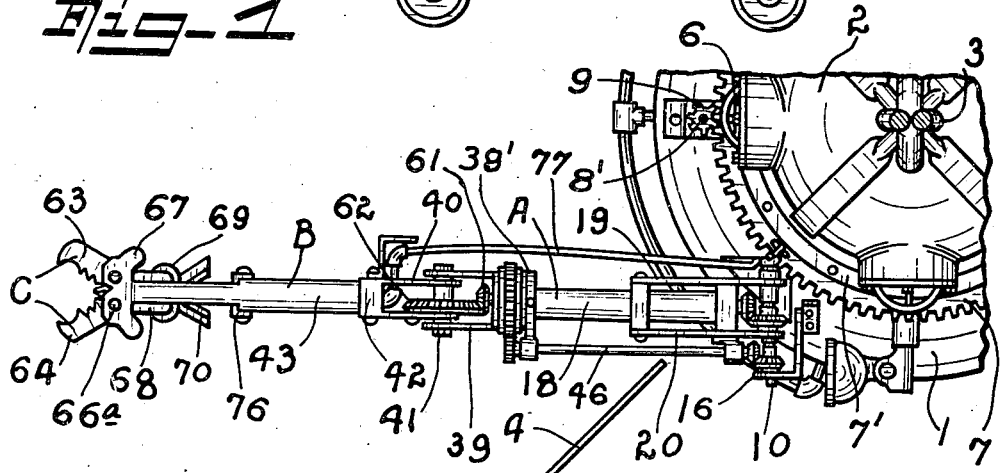
Figure 2 is an enlarged, broken, sectional view of the inner or main section of one of the duplex arms, showing the control devices for the three movements of the flexible arm.

The forearm is revolved or rotated on its longitudinal axis from the ratchet device 25 on shaft 10, through the instrumentality of a pinion 44 on the shaft and a complementary pinion 45 on the shaft 46 located at one side of and parallel with the main-section of the flexible arm, and journaled in bearings 47 mounted on the exterior of the main-section. The outer end of the shaft 46 is provided with a pinion 48 which engages with the rack ring 49, which as best seen in Figure 2 is fixed in suitable manner to the head 38. The head 38 and ring 49 are thus rigidly fixed together to turn on the outer end of the tubular main section A and they are retained against displacement by fixed collars 38' on the outer end of the tubular section A or A' of the flexible arm.

The bending or flexing movement of the forearm with relation to the main-section of the arm is a pivotal movement on the bolt 41, accomplished through the use of the inner tubular shaft 11 of the composite trunnion of the flexible shaft. This tubular shaft, as best seen in Figure 7 has a crank arm 50 fixed thereon, within the bell, and the arm is moved to turn the tubular shaft through the use of a hydraulic jack comprising a cylinder 51 having its piston 52 connected with the crank arm. The jack is provided with a rigid post 53 fixed to the lower head of the cylinder, and this post is pivoted at 54 on the bottom of the bell in order that the jack may bodily move to compensate for the crank-arm movement. The jack is manually controlled through the use of a pump 55 that is operated by the lever-handle 56, and a suitable release device as indicated at 57. By operating the pump, the jack is actuated to swing the crank arm upwardly in Figure 7 and thus swing the forearm B to its position in Figure 1. When pressure is released at 57, the forearm swings downwardly on its pivot 41 into alinement with the main-section of the arm, and may be held in that position by the pressure in the jack-cylinder.

The inner tubular shaft 11 is turned in its bearings by movement of the crank arm 50, and in Figure 2 it will be seen that the tubular shaft, exterior of the bell, is provided with a bevel gear 58 that meshes with a complementary bevel gear 59 keyed on the gear shaft 60 that extends along the axial center of the tubular main-section A or A' of the flexible arm or arms.

The gear shaft 60 is journaled in suitable bearings in the main section A or A' and it projects through the end of the tubular part 18 of the main-section. The projecting end of the shaft 60 is provided with a bevel pinion 61 which meshes with the rack ring 62 that is journaled on the bolt 41 between the two plates 40, 40 of the forearm, and this rack ring is bolted or otherwise fixed to one of the plates. Thus it will be apparent that power is transmitted through the tubular shaft 11 and the gear shaft 60, from the hydraulic jack to swing the forearm on its pivot 41.

At the free end of each of the flexible arms, a pair of complementary grappling jaws 63 and 64 are mounted, a spring 65 being employed to open the jaws to the position of Figure 3, and each jaw having a segmental rack as 66 in order that the jaws may move synchronously on their pivots 66a. The pivoted jaws are mounted in a head 60 at the free end of the forearm, and each of the jaws has a rigid arm 68 in which a pair of anti-friction rollers 69 are journaled, the rollers being normally held in juxtaposition under action of the tension spring 65. To close the jaws, the rollers are spread apart, and for this purpose I employ a V-shaped wedge or cam 70 that is reciprocable in the frame 71 which rigidly joins the head 67 with the housing 43 of the forearm.

The jaw-closing wedge 70 is mounted at the end of a piston rod 72, and the rod has a head or piston 73 that is reciprocable in the cylinder 74 mounted within the cylindrical housing 43 of the forearm. A spring 75 surrounds the piston rod and is interposed between the piston 73 and a cross arm 76 at the front end of the housing, for the purpose of withdrawing the wedge from the rollers to permit opening of the jaws, in the absence of pressure against the head 73 of the jaw-operating means.

The jaws are closed under motive fluid pressure, as for instance, water pressure applied through the water tube or pipe 77, applied against the piston head 73 through the head 78 of the cylinder. The water pipe 77 enters through the wall of the bell near the pivotal joint of the flexible arm and this pipe is connected with a water reservoir 79 located within, and suitably supported from the wall of, the bell. A tank 80 is located near the bottom of the bell and provided with compressed air, and air under pressure is provided for the reservoir 79 through air pipe 81, a gage 82 being interposed in the pipe to indicate the pressure to the operator. The feed of compressed air to the reservoir is controlled by the air valve 83, and a vent pipe 84 and its valve 85 are employed for reducing the air pressure in the reservoir 79, the feed valve 83 of course being closed when the vent valve is open, and vice versa. When the feed valve, is closed and the vent valve is open, it will be apparent that the spring 75, that has been compresed under hydro-pneumatic pressure, is now free to push the piston 74 to the right in Figure 3 to permit opening of the jaws 63—64, and water from the cylinder 74, at the right of piston 73, is forced back into the reservoir within the bell.

In Figure 4 a seat 86 is shown for use of the operator, and the control devices for the various operating parts are located in readily accessible positions for his hands and feet.

Various accessories, as an air conditioner 87, and a signal board 88 are shown within the bell, and other accessories are also illustrated exterior of the bell, for use of the operator.

Details of construction are also illustrated to indicate necessary or required devices for the safety of the operator, and to facilitate the operation of the grappling arms, as well as to prevent binding of parts under water pressure, and to prevent leaks at joints in the bell as well as in the operating parts of the equipment.

The flexible arms are especially designed for use with the bell illustrated, which is revolvable as a whole on its vertical axis, and it will be apparent that the swinging and flexing movements of the flexible arms, and the rotary movement of the forearms of the flexible arms, assure working of the apparatus or equipment in practically all possible positions with relation to the wreck that is being salvaged, or with respect to other underwater operations. The manipulation, operation, and control of the working parts are all provided for in close, compact arrangement in the interior of the bell, and the operator therein is enabled to work with comparative convenience and comfort in the performance of the functions required of the apparatus.

Having thus fully described my invention, what I claim as new and desire to secure by Letters Patent is:—

1. In a submarine salvaging apparatus having a rotary, flexible grappling arm, the combination with a bell, of a composite trunnion including an outer tubular shaft rigid with said arm, a ratchet device for turning said shaft and means for retaining the shaft in adjusted position, an inner tubular shaft having a bevel gear thereon and means for turning said shaft, and means for flexing said arm comprising a complementary bevel gear in engagement with the first bevel gear.

2. In a submarine salvaging apparatus having a rotary, flexible, grappling arm, the combination with a bell, of a composite trunnion including an outer tubular shaft rigid with the arm, a ratchet device for turning said shaft and means for retaining the shaft in adjusted position, an inner tubular shaft having a bevel gear thereon, means for turning said inner shaft, a gear shaft mounted in said arm, a bevel gear at one end of said shaft engaging the first mentioned bevel gear, a bevel gear at the other end of said shaft, and a rack gear mounted in the flexible arm in engagement with the last mentioned bevel gear.

3. In a submarine salvaging apparatus having a flexible rotary grappling arm, the combination with a bell, of a composite trunnion including an outer tubular shaft rigid with said arm, a manually operated ratchet device for rotatively adjusting said arm and means for holding the arm in adjusted position, means for flexing the arm and transmission means mounted on the arm, an inner tubular shaft and means thereon co-acting with said transmission means, a crank arm on the inner shaft, and a manually controlled hydraulic jack for actuating said crank arm.

4. In a submarine salvaging apparatus having a rotary flexible grappling arm and a forearm revolvable on its longitudinal axis, the combination with a bell, of a composite trunnion including three concentric shafts one of which is rigid with the grappling arm, separate means for turning each shaft, power-transmission means from each of the other two shafts, means actuated by one of the power-transmission means for flexing the shaft, and means actuated by the other power-transmission means for revolving the forearm.

5. In a submarine salvaging apparatus having a rotary, flexible grappling arm and a pair of pivoted grappling jaws at the free end of said arm, the combination with a bell, of a composite trunnion comprising a pair of concentric shafts one of which is rigid with the arm and separate means for turning said shafts, means for flexing the arm and means actuated by the other shaft for operating the flexing means, operating means for the jaws, hydraulic mechanism for actuating said operating means, and motive-fluid-pressure mechanism combined with said hydraulic mechanism.

EUGENE J. ROMANO.